US011273867B2

United States Patent
Sovern et al.

(10) Patent No.: US 11,273,867 B2
(45) Date of Patent: Mar. 15, 2022

(54) STEERING ANGLE SENSOR ASSEMBLY AND STEERING GEARBOX FOR A VEHICLE INCLUDING SAME

(71) Applicant: Honda Motor Co., Ltd., Tokyo (JP)

(72) Inventors: Jason A. Sovern, Marysville, OH (US); Seth A. Ritchie, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 323 days.

(21) Appl. No.: 16/739,510

(22) Filed: Jan. 10, 2020

(65) Prior Publication Data

US 2021/0214006 A1 Jul. 15, 2021

(51) Int. Cl.
*B62D 5/04* (2006.01)
*B62D 15/02* (2006.01)

(52) U.S. Cl.
CPC ....... *B62D 15/0225* (2013.01); *B62D 5/0403* (2013.01)

(58) Field of Classification Search
CPC .............. B62D 15/0225; B62D 5/0403; B62D 15/0215
See application file for complete search history.

(56) References Cited

U.S. PATENT DOCUMENTS

| | | | |
|---|---|---|---|
| 5,088,319 A | 2/1992 | Hirose et al. | |
| 5,174,425 A | 12/1992 | Takahashi et al. | |
| 5,373,444 A | 12/1994 | Takahashi | |
| 6,271,515 B1 | 8/2001 | Matsumoto | |
| 7,117,761 B1 | 10/2006 | Andersson et al. | |
| 7,322,115 B2 | 1/2008 | Besier et al. | |
| 7,669,690 B2 | 3/2010 | Makabe et al. | |
| 7,840,324 B2 | 11/2010 | Kato et al. | |
| 8,662,240 B2 | 3/2014 | Higashi et al. | |
| 8,775,028 B2 | 7/2014 | Tashiro | |
| 8,813,901 B2 | 8/2014 | Tashiro | |
| 8,943,879 B2 | 2/2015 | Kang | |
| 8,960,364 B2 * | 2/2015 | Ji .......................... | B62D 5/0403 180/446 |
| 8,963,543 B2 | 2/2015 | Moldenhauer | |
| 9,086,269 B2 | 7/2015 | Takayanagi et al. | |

(Continued)

FOREIGN PATENT DOCUMENTS

CN 203472992 U 3/2014
DE 202009011506 U1 4/2010

(Continued)

*Primary Examiner* — Freddie Kirkland, III
(74) *Attorney, Agent, or Firm* — Kenealy Vaidya LLP

(57) ABSTRACT

A steering angle sensor assembly for a vehicle steering gearbox can include a protective housing mounted to a housing of the steering gearbox and a steering angle sensor. The protective housing can include a case, a cover and a gasket connected to each other such that the case, the cover and the gasket form an interior space with the gasket sandwiched between the case and the cover. Each of the case and the cover can include an opening configured to receive a pinion shaft of the steering gearbox when the steering angle sensor assembly is mounted on the housing. The steering angle sensor can be secured in the interior space of the protective housing and can engage the pinion shaft when the protective housing is mounted to the housing and the pinion shaft is received by the opening in each of the case and cover.

20 Claims, 6 Drawing Sheets

(56) References Cited

U.S. PATENT DOCUMENTS

| | | |
|---|---|---|
| 9,126,618 B2 | 9/2015 | Hayama |
| 9,212,892 B2 | 12/2015 | Takayanagi et al. |
| 9,403,554 B2 | 8/2016 | Henning et al. |
| 9,683,873 B2 * | 6/2017 | Lee ..................... G01D 11/245 |
| 2003/0019113 A1 | 1/2003 | Kofink et al. |
| 2008/0061956 A1 | 3/2008 | Takeuchi |
| 2010/0235054 A1 | 9/2010 | Hoskins et al. |
| 2020/0088553 A1 * | 3/2020 | Kimoto ................... F16J 3/042 |

FOREIGN PATENT DOCUMENTS

| | | |
|---|---|---|
| EP | 0423080 B1 | 1/1993 |
| JP | H09118247 A | 5/1997 |
| JP | 2008089383 A | 4/2008 |
| JP | 2009192248 A | 8/2009 |
| JP | 5438623 B2 | 3/2014 |
| JP | 2018188046 A | 11/2018 |
| KR | 100962048 B1 | 6/2010 |
| WO | WO2011062399 A2 | 5/2011 |
| WO | WO2011062431 A2 | 5/2011 |
| WO | WO2017186546 A1 | 11/2017 |

\* cited by examiner

STEERING ANGLE SENSOR ASSEMBLY AND STEERING GEARBOX FOR A VEHICLE INCLUDING SAME

BACKGROUND

The disclosed subject matter relates to a steering gearbox for a vehicle that includes a steering angle sensor configured to detect rotary motion of a steering column connected to a steering gearbox. More particularly, the disclosed subject matter relates to methods and apparatus for protecting the steering angle sensor from contaminants.

A steering angle sensor can detect rotary movement of a portion of a vehicle steering column. The data from the steering angle sensor can reflect a driver's input to the steering wheel such as the amount of angular rotation of the steering wheel and the rate of rotation of the steering wheel. The steering angle sensor can provide this data to a vehicle's control unit, that may include an electronic stability control system so that the control unit or electronic stability control system can judge whether to provide a corrective input to any one of or any combination of a braking system, a torque vectoring system and the powertrain. Data from the steering angle sensor can also be used to by other vehicle systems, such as but not limited to an adaptive cruise control system, a lane departure warning/avoidance system, a parking assist system, in order to determine when a steering input by the vehicle system has achieved the desired target steering input.

SUMMARY

Some embodiments are directed to a steering angle sensor assembly for a vehicle steering gearbox. The steering gearbox can include a gearbox housing and a pinion shaft protruding from the gearbox housing. The sensor assembly can include a protective housing and a steering angle sensor. The protective housing can be configured to be mounted to the gearbox housing. The protective housing can include a case, a cover and a gasket. The case can include a first opening through the case that is configured to receive the pinion shaft when the protective housing is mounted to the gearbox housing. The cover can include a second opening through the cover that is configured to receive the pinion shaft when the protective housing is mounted to the gearbox housing. The gasket can be sandwiched between the case and the cover. The case, the cover, and the gasket can be bolted to each other such that the case, the cover and the gasket form an interior space. The steering angle sensor can be secured in the interior space of the protective housing. The steering angle sensor can include a mating spline configured to engage a spline on the pinion shaft such that the steering angle sensor detects rotational motion of the pinion shaft when the protective housing is mounted to the gearbox housing and the pinion shaft is received in the first and second openings.

Some embodiments are directed to a steering gearbox for a vehicle that can include a gearbox housing, a rack, a pinion shaft; a protective housing and steering angle sensor. The rack can be supported in the gearbox housing to reciprocate along a transverse direction of the vehicle. The pinion shaft can extend into and be rotatably supported in the gearbox housing. The pinion shaft can include a pinion that engages the rack, and a portion of the pinion shaft can be located outside of the gearbox and include an external spline. The protective housing can be mounted to the gearbox housing and can includes a case, a cover and a gasket. The case can include a first opening through the case. The pinion shaft can extend into the first opening and through the protective housing. The cover can include a second opening that extends through the cover, and the pinion shaft can extend through the second opening. The gasket can be sandwiched between the cover and the case. The case, the cover, and the gasket can be connected to each other such that the case, the cover and the gasket form an interior space. The steering angle sensor can be secured in the interior space of the protective housing. The steering angle sensor can include a mating spline engaged with the external spline on the pinion shaft such that the steering angle sensor detects rotational motion of the pinion shaft.

Some embodiments are directed to a steering angle sensor assembly for a vehicle steering gearbox. The steering gearbox can include a gearbox housing and a pinion shaft protruding from the gearbox housing. The sensor assembly can include a protective housing and a steering angle sensor. The protective housing can be configured to be mounted to the gearbox housing. The protective housing can include a case, a cover and gasket. The case can include a first opening through the case that is configured to receive the pinion shaft when the protective housing is mounted to the gearbox housing. The cover can include a second opening through the cover that is configured to receive the pinion shaft when the protective housing is mounted to the gearbox housing. The gasket can be sandwiched between the case and the cover. The case, the cover and the gasket are connected to each other such that the case, the cover and the gasket form an interior space. The steering angle sensor can be secured in the interior space of the protective housing. The steering angle sensor can be configured to engage the pinion shaft such that the steering angle sensor detects rotational motion of the pinion shaft when the protective housing is mounted to the gearbox housing and the pinion shaft is received in the first and second openings.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
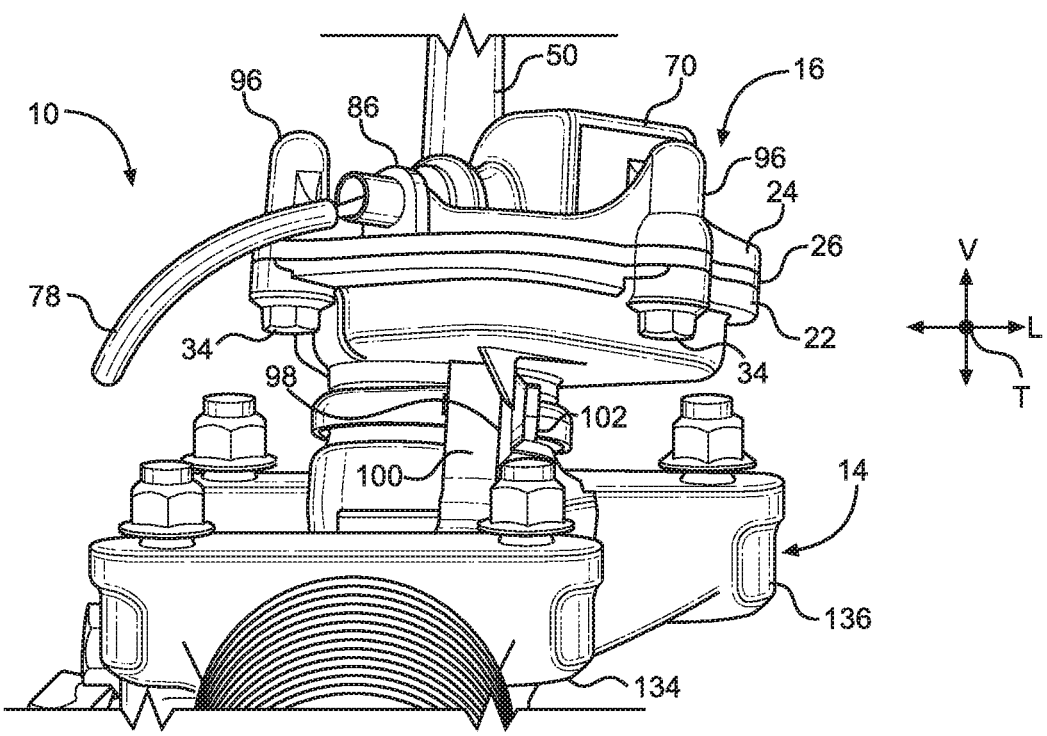
FIG. 1 is partial plan view of the right end of a steering gearbox made in accordance with principles of the disclosed subject matter.
Figure 2:
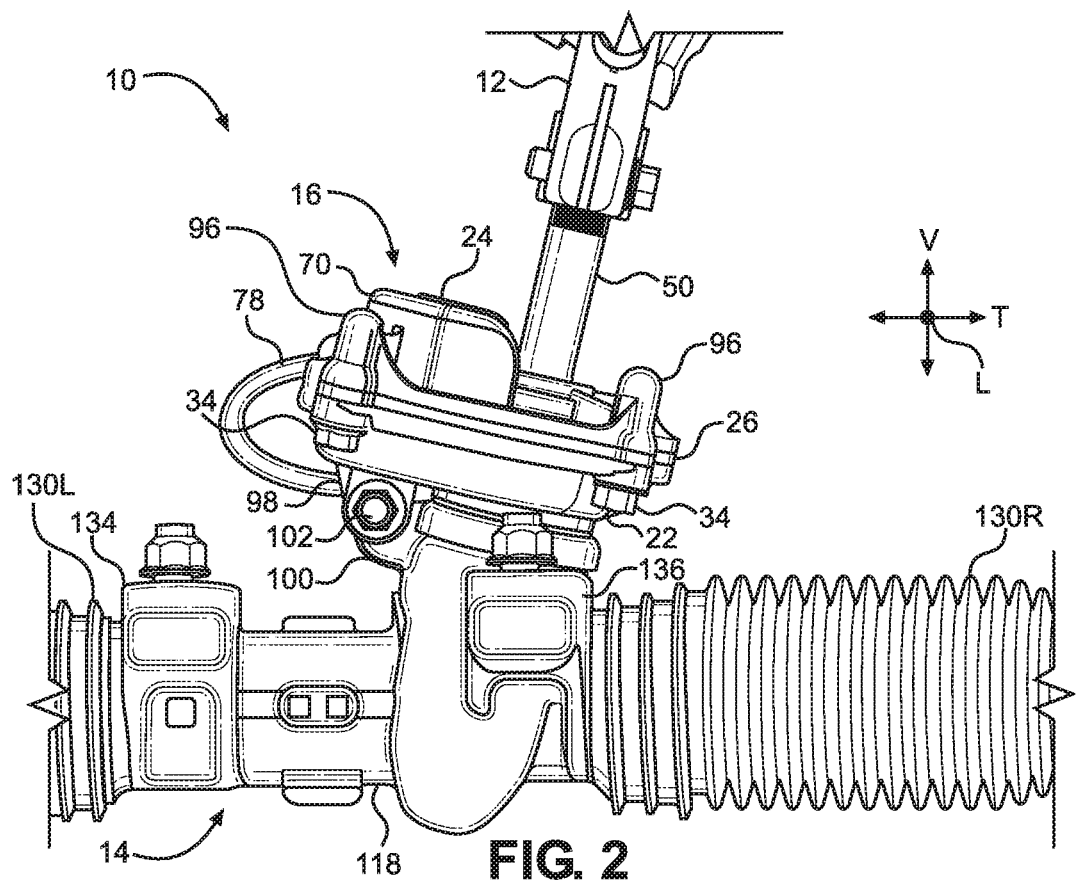
FIG. 2 is a partial plan view of the front of the steering gearbox of FIG. 1.
Figure 4:
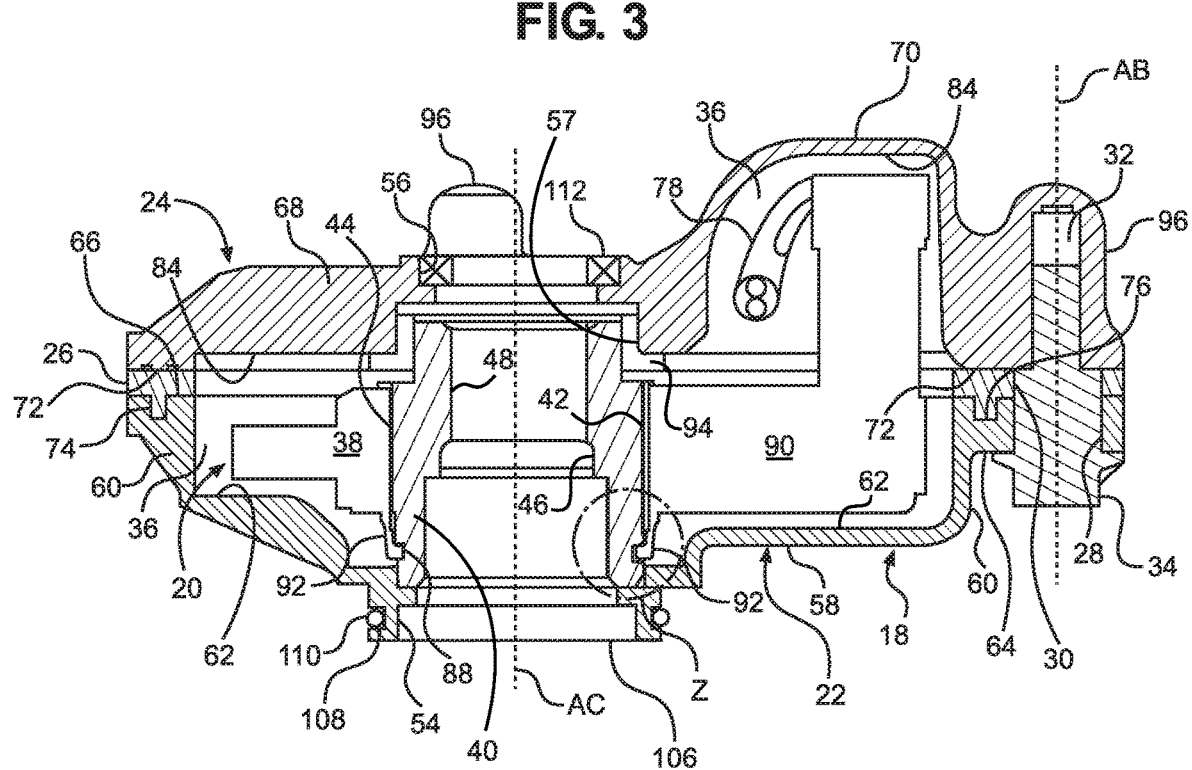
FIG. 4 is a cross-sectional view taken along 4-4 of FIG. 3.
Figure 8:
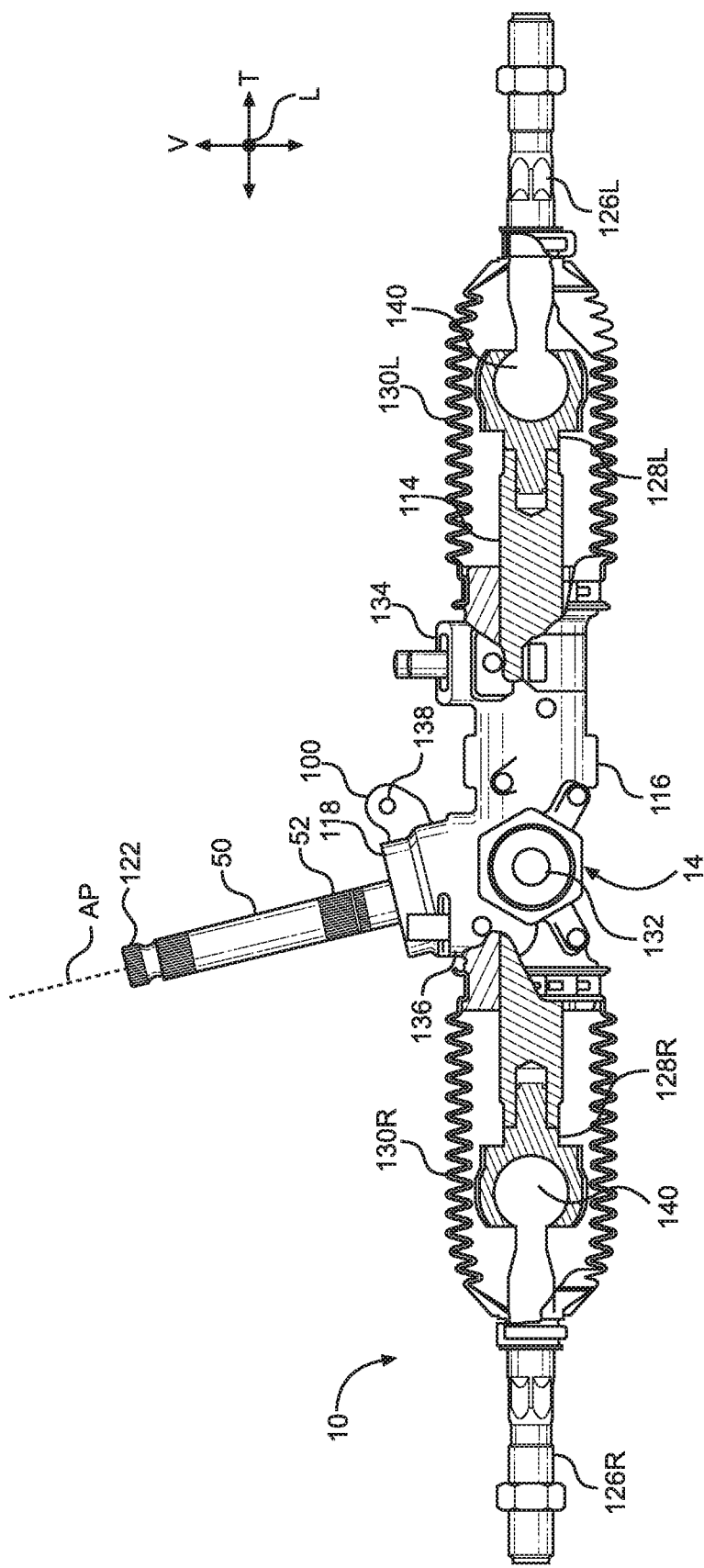
FIG. 8 is a front plan view of a steering gearbox of FIG. 1 with the steering angle sensor assembly omitted.

FIGS. 1 and 2 illustrate an embodiment of a steering gearbox 10 for a vehicle made in accordance with principles of the disclosed subject matter. The steering gearbox 10 can be connected to a steering column 12 that connects the steering gearbox 10 to a steering wheel in a passenger space of the vehicle. The steering gearbox 10 can include a gearbox housing 14 and a steering angle sensor assembly 16 mounted to the gearbox housing 14 in any appropriate manner such as but not limited to mechanical fasteners, welding, adhesive or any combination thereof. The steering gearbox 10 can include a pinion shaft 50. The pinion shaft 50 can pass through the steering angle sensor assembly 16 and into the gearbox housing 14. Referring to FIG. 8, the pinion shaft 50 can rotate about an axis of rotation AP. Referring to FIG. 4, the steering angle sensor assembly 16 can include a steering angle sensor 20 configured to detect rotational motion of the pinion shaft 50 about the axis of rotation AP and output data indicative of the rotational motion of the pinion shaft 50.

In addition to the systems described above, data from a steering angle sensor assembly 16 can be advantageous for an active-suspension system or a semi-active suspension system. Data from the steering angle sensor can be used to adjust a damping rate of a cushion (also referred to as a damper or a shock absorber). For example, the active or semi-active suspension can use the steering angle data to determine when a vehicle is traveling along a curved path and increase the damping rate (also referred to as stiffen the cushion) of the cushions connected to the outside wheels to limit roll of the vehicle.

Figure 5:
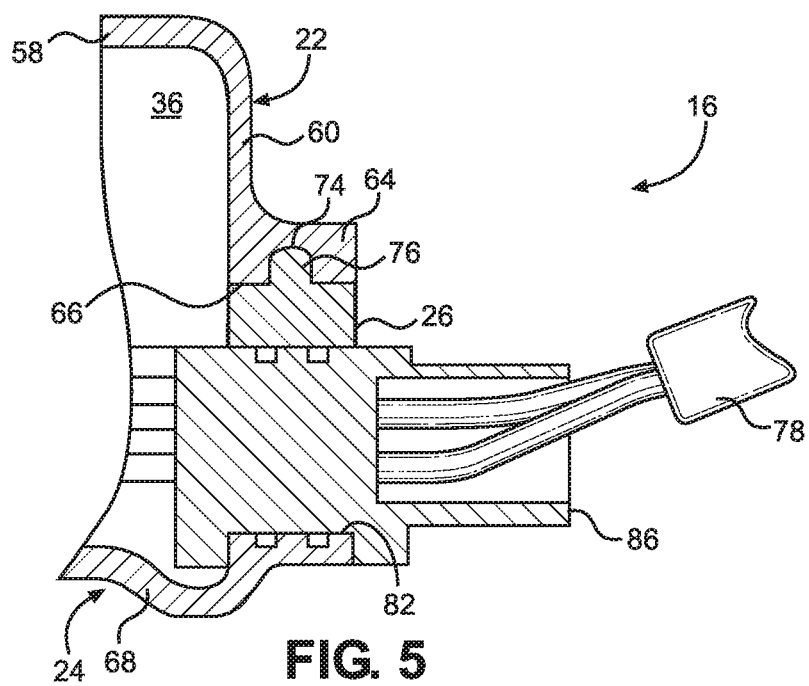
FIG. 5 is a cross-sectional view taken along 5-5 of FIG. 3.

The steering angle sensor assembly 16 can be exposed to the elements when the vehicle is in use. For example, the vehicle can be specialized for use on an unimproved path or on an unmarked path, and can be referred to as a multipurpose utility vehicle (MUV) or as a side-by-side all-terrain vehicle (SxS, or SxS ATV). Referring to FIGS. 4 and 5, the steering angle sensor assembly 16 can include a protective housing 18 that can enclose and seal a steering angle sensor 20 from contaminants such as but not limited to grease, water, snow, mud, dirt, dust, stones, branches and other substances that can adversely impact the performance of the steering angle sensor 20 if the substance came into contact with the steering angle sensor 20.

Referring to FIGS. 1-5 collectively, the protective housing 18 can include a case 22, a cover 24 and a gasket 26. The gasket 26 can be sandwiched between the case 22 and the cover 24. The case 22, cover 24 and gasket 26 can be connected together in any appropriate manner such as but not limited to threaded fasteners, clamps, rivets, adhesive, welds, or any combination thereof. Referring to FIG. 4, the case 22 can include a plurality of through holes 28, the gasket 26 can include a plurality of through holes 30 and the cover 24 can include a plurality of blind bores 32. Each blind bore 32 can be aligned with a respective one of the through holes 28 in the case 22 and the holes 30 in the gasket 26 such that the through holes 28, 30 and the blind bore 32 are centered about a bolt axis AB. A flanged bolt 34 can be inserted through the respective through holes 28, 30 and threaded into the respective blind bore 32. The blind bore 32 can include internal threads that engage the external threads on the bolts 34. Alternatively, the blind bore 32 can be devoid of threads and the bolt 34 can include self-tapping threads.

Referring to FIG. 4, the case 22, cover 24 and gasket 26 can form an interior space 36 in which the steering angle sensor 20 can be mounted. The steering angle sensor 20 can be connected to either or both of the case 22 and the cover 24 in any appropriate manner.

The steering angle sensor 20 can include an electronics member 38 and a sensor collar 40. The collar 40 can be configured to interact with the electronic member such that rotation of the collar 40 causes the electronics member 38 to produce a signal that is indicative of the rotational amount and/or rotational speed of the collar 40.

The electronics member 38 can include a connection structure(s), a printed circuit board and electronics components. The connection structure can be any appropriate structure that can interact with the case 22 and/or the cover 24 to secure the position of the steering angle sensor 20 in the interior space 36 of the protective housing 18. The electronics member 38 can include any appropriate electronic components that can convert rotational motion of the sensor collar 40 into a data signal that can be processed by an electronic control unit. The electronics member 38 can include a through hole 42. The sensor collar 40 can extend through the through hole 42.

The sensor collar 40 can rotate about an axis of rotation AC relative to the electronics member 38. The axis of rotation AC of the sensor collar 40 can be colinear to the axis of rotation AP of the pinion shaft 50. The sensor collar 40 can be symmetrical about the axis of rotational AC. The bolt axis AB can be parallel to or substantially parallel to the axis of rotation AC of the sensor collar 40 such that one of ordinary skill in the art would perceive that bolt axis AB to be parallel to the axis of rotation AC.

Figure 9:
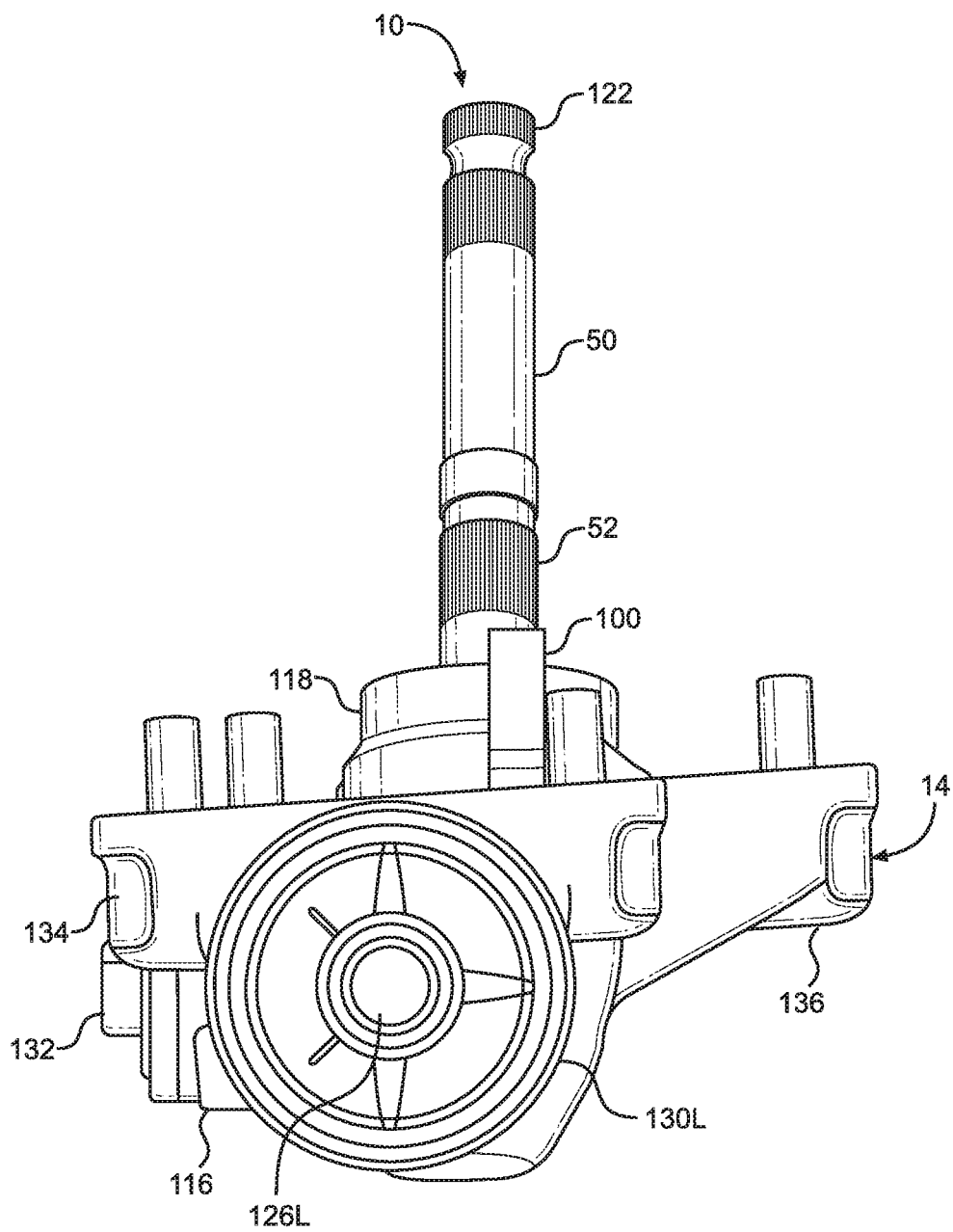
FIG. 9 is a plan view of the right end of the steering gearbox of FIG. 8.

The sensor collar 40 can have a hollow cylindrical shape and can include a cylindrical outer surface 44 and a cylindrical inner surface 46. The inner surface 46 can include at least one internal spline 48. Referring to FIGS. 8 and 9, the pinion shaft 50 can include at least one mating external spline 52 that engages the internal spline 48 on the inner surface 46. Thus, the sensor collar 40 can rotate in unison with the pinion shaft 50. Alternate embodiments can include a plurality of internal splines 48 that mesh with a plurality of external splines 52.

Referring to FIG. 4, the outer cylindrical surface 44 of the sensor collar 40 can include an annular groove 88 that extends around the entire circumference of the outer cylindrical surface 44. The electronics member 38 can include a main body 90 and a pair of lock arms 92. The through hole 42 can extend through the main body 90. The lock arms 92 can extend from the main body 90 and be adjacent to the through hole 42. The lock arms 92 can also be cantilevered to the main body 90 and can be resiliently deformed by the sensor collar 40 during insertion of the sensor collar 40 into the through hole 42. The lock arms 92 can extend into the annular groove 88. and be configured to locate the sensor collar 40 relative to the main body 90 at a predetermined position on the axis of rotation AC.

Figure 7:
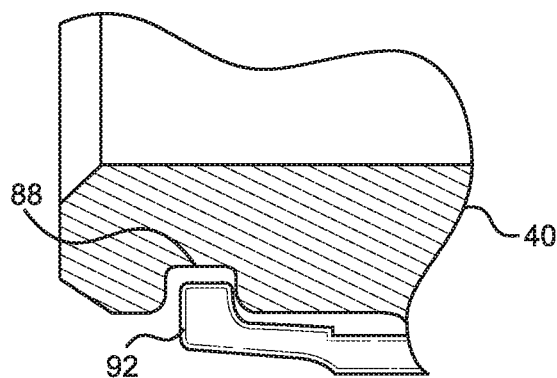
FIG. 7 is an enlarged view of area Z of FIG. 4.

FIG. 7 is an enlarged view of area Z of FIG. 4 and shows the annular groove 88 and one of the lock arms 92. The other lock arm 92 of FIG. 4 can be a mirror image of the lock arm shown in FIG. 7. The case 22 is omitted from FIG. 7 for clarity and simplicity of the drawing.

Referring to FIG. 4, the case 22 can include a shaft opening 54 and the cover 24 can include a shaft opening 56. The openings 54, 56 can receive the pinion shaft 50 and the pinion shaft 50 can pass through the protective housing 18 so that the internal spline 48 in the sensor collar 40 can engage with the mating external spline 52 on the pinion shaft 50.

Referring to FIGS. 4 and 5, the case 22 can include a main wall 58 and a perimeter wall 60. The main wall 58 and the perimeter wall 60 can separate the interior space 36 from an exterior space outside of the protective housing 18. The main wall 58 can include an inner surface 62 that faces the interior space 36. The perimeter wall 60 can project from and encircle the inner surface 62. The perimeter wall 60 can project from the inner surface 62 in a direction that is parallel or substantially parallel to the axis of rotation AC of the sensor collar 40 such that one of ordinary skill in the art would perceive the perimeter wall 60 as projecting parallel to the axis of rotation AC.

The case 22 can include a mounting flange 64 and a sealing surface 66. The mounting flange 64 can extend along the perimeter wall 60. The sealing surface 66 can engage the gasket 26. The sealing surface 66 can be on the mounting flange 64. The sealing surface 66 can be perpendicular or substantially perpendicular to the axis of rotation AC of the sensor collar 40 such that one of ordinary skill in the art would perceive the sealing surface 66 as being perpendicular to the axis of rotation AC. The sealing surface 66 can be an annular surface that extends around the perimeter of the case 22.

The sealing surface 66 can include a groove 74 and the gasket 26 can include a ridge 76 that extends into the groove 74. The groove 74 and the ridge 76 can assist proper alignment of the gasket 26 relative to the sealing surface 66 during assembly of the protective housing 18. The groove 74 and the ridge 76 can hold the gasket 26 on the case 22 until the cover 24 is placed on the gasket 26 and the bolts 34 are tightened to connect the case 22, the cover 24 and the gasket 26.

The cover 24 can include a main wall 68 and a wiring housing 70. The main wall 68 and the wiring housing 70 can separate the interior space 36 from an exterior space outside of the protective housing 18. The main wall 68 and the wiring housing 70 can include an inner surface 84 that faces the interior space 36. The wiring housing 70 can protrude away from main wall 68 in a direction that is parallel or substantially parallel to the axis of rotation AC of the sensor collar 40 such that one of ordinary skill in the art would perceive the wiring housing 70 as protruding parallel to the axis of rotation AC. The wiring housing 70 can be in communication with the interior space 36.

The cover 24 can include a sealing surface 72 that is spaced away from the inner surface 84 by a small projection. The sealing surface 72 can engage the gasket 26. The sealing surface 72 can be perpendicular or substantially perpendicular to the axis of rotation AC of the sensor collar 40 such that one of ordinary skill in the art would perceive the sealing surface 72 as being perpendicular to the axis of rotation AC. The sealing surface 72 can be an annular surface that extends around the perimeter of the cover 24. Alternative embodiments can include the groove 74 formed in the sealing surface 72 of the cover 24 instead of in the sealing surface 66 of the case 22.

Figure 6:
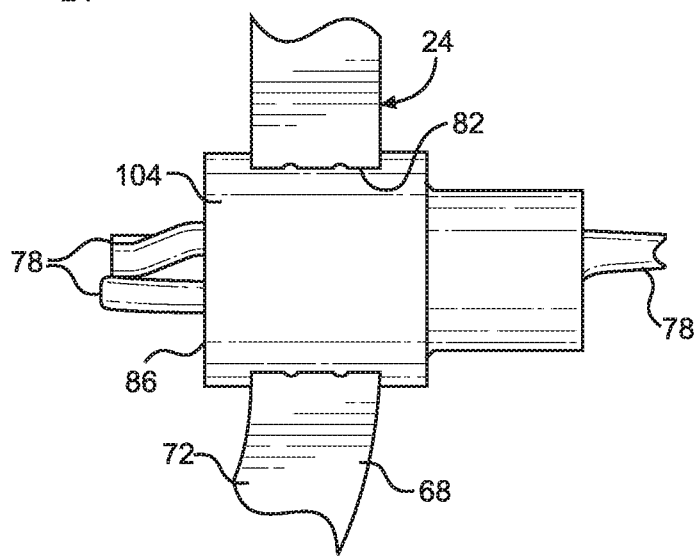
FIG. 6 is an enlarged view of area C of FIG. 3 with the case removed to show the cover, grommet and wire harness.

Referring to FIGS. 5 and 6, the cover 24 can include a wiring opening 82 and a grommet 86. In FIG. 6, the case 22 has been removed to more clearly illustrate the structural interaction between the cover 24 and the grommet 86. The wiring opening 82 can be in communication with the wiring housing 70. The wiring opening 82 can extend from the sealing surface 72 of the cover 24. The grommet 86 can be mounted in the wiring opening 82. The grommet 86 can include a bottom surface 104 that is flush with the sealing surface 72 of the cover 24.

Figure 3:
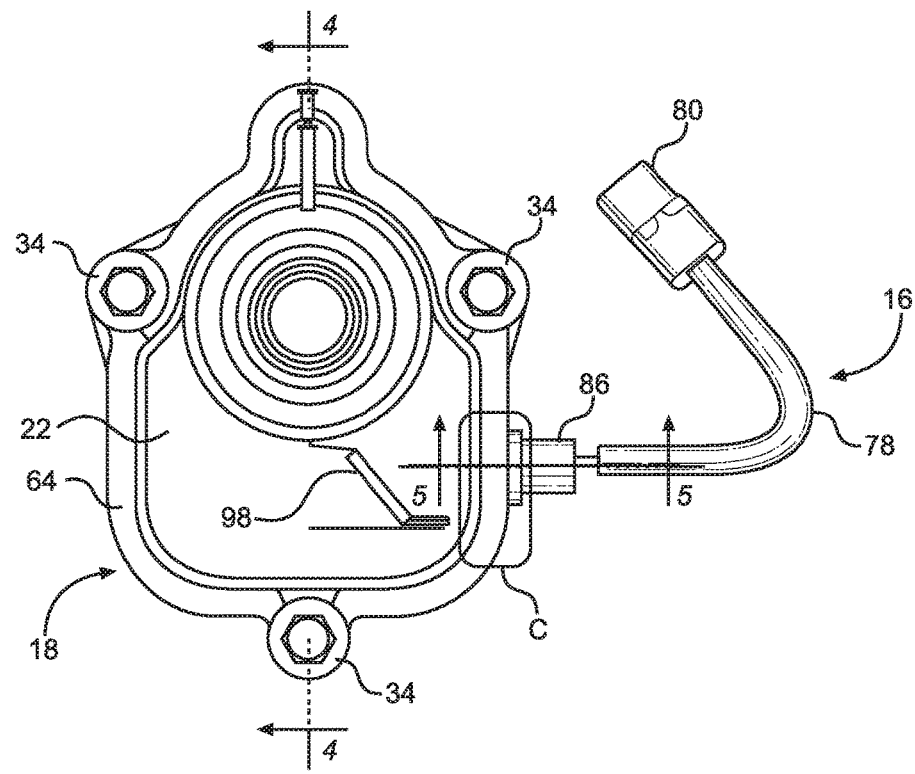
FIG. 3 is a bottom plan view of a steering angle sensor assembly made in accordance with principles of the disclosed subject matter.

Referring to FIGS. 1-3, 5 and 6, the steering angle sensor assembly 16 can include a wire harness 78 that is electrically connected to the steering angle sensor 20 and extends outside of the protective housing 18. The wire harness 78 can include one or more electrical conductors covered by insulation. The wire harness 78 can be configured to supply electrical power to the steering angle sensor 20 and transmit electrical signals to and from the steering angle sensor 20. Referring to FIG. 3, the wire harness 78 can include a connector 80 connected to a mating connector of another wiring harness or a power supply and an electronic control unit.

Referring to FIGS. 1, 3, 5 and 6, the wire harness 78 can pass through the wiring opening 82 and the grommet 86. The grommet 86 can engage each of the cover 24, the wire harness 78 and the gasket 26 such that the grommet 86 forms a seal between the wiring opening 82 and the wire harness 78.

Referring to FIG. 4, the steering angle sensor 20 can include a bushing 94. The bushing 94 can be fixed to an inner bore 57 of the shaft opening 56 in any appropriate manner such as but not limited to a press fit, staking, etc. The bushing 94 can rotationally support the sensor collar 40 for rotation relative to the cover 24 about the axis of rotation AC.

Referring to FIGS. 1, 2 and 4, the cover 24 can include a plurality of projections 96 spaced around a perimeter of the main wall 68. Each of the projections 96 can extend away from the main wall 68 in a direction that is parallel or substantially parallel to the axis of rotation AC such that one of ordinary skill in the art would perceive the projections 96 as being parallel to the axis of rotation AC. Each of the projections 96 can include the blind bore 32, which is opened toward the gasket 26.

Referring to FIG. 4, the case 22 can include a cylindrical collar 106 that extends from an exterior side of the main wall 58 along the axis of rotation AC of the sensor collar 40. The cylindrical collar 106 can include an outer circumferential surface and an annular groove 108 in the outer circumferential surface. The case 22 can include an O-ring 110 seated in the annular groove 108. The cylindrical collar 106 and the O-ring 110 can be inserted into a mating portion of the gearbox housing 14. The O-ring 110 can form a seal between the cylindrical collar 106 and the gearbox housing 14.

The cover 24 can include a seal 112 fixed in the shaft opening 56 and in contact with the surface of the cover 24 that encircles the shaft opening 56. The seal 112 can engage the pinion shaft 50 when the steering angle sensor assembly 16 is mounted on the gearbox housing 14 and the pinion shaft 50 extends through the protective housing 18. FIG. 4 schematically illustrates the seal 112. The seal 112 can be any appropriate seal such as but not limited to a lip seal.

Thus, the gasket 26, the grommet 86, the O-ring 110 and the seal 112 can seal the interior space 36 from the ambient environment.

Referring to FIGS. 1-3, the case 22 can include a mounting flange 98 that extends away from the case 22. Referring to FIGS. 1, 2 and 8, the gearbox housing 14 can include a mounting flange 100. The mounting flange 98 of the case 22 can be connected to the mounting flange 100 of the gearbox housing 14. A flanged bolt 102 can connect the mounting flange 98 of the case 22 to the mounting flange 100 of the gearbox housing 14. Thus, the mounting flanges 98, 100 and the mating splines 48, 52 can connect the steering angle sensor assembly 16 in a predetermined orientation with respect to and at location on the steering gearbox 10.

The steering gearbox 10 can be mounted to a vehicle that extends in a longitudinal direction L, a transverse direction T and a vertical direction V, which directions are orthogonal to each other. The axis of rotation AP can be at an angle to the longitudinal direction L and/or the transverse direction T and/or the vertical direction V such that the axis of rotation AP is not perpendicular to one or more of the directions L, T, V of the vehicle.

FIG. 8-11 illustrate further details of the steering gearbox 10 of FIGS. 1 and 2. The steering angle sensor assembly 16 is omitted from FIGS. 8-11 for simplicity and clarity of the drawings.

The gearbox housing 14 can include a first housing portion 116 and a second housing portion 118. The first housing portion 116 can extend along the transverse direction T of the vehicle. The second housing portion 118 can extend along the axis of rotation AP of the pinion shaft 50. The gearbox housing 14 can support the pinion shaft 50 in the second housing portion 118 such that the pinion shaft 50 can rotate about the axis of rotation AP.

The cylindrical collar 106 can extend into the second housing portion 118. The O-ring 110 can engage a cylindrical inner surface of the second housing portion 118 to form a seal between the cylindrical collar 106 and the second housing portion 118.

Figure 10:
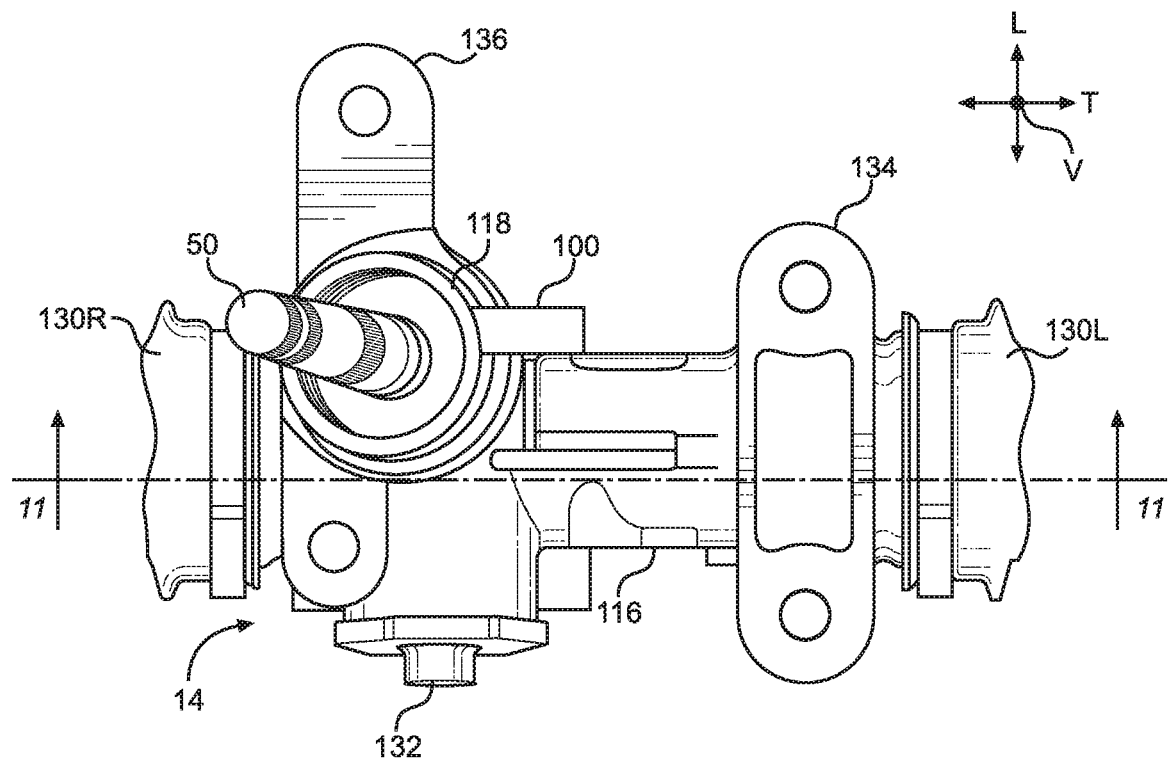
FIG. 10 is a partial plan view of the top of the steering gearbox of FIG. 8.

Referring to FIGS. 8-10, the mounting flange 100 can extend from the second housing portion 118 of the gearbox housing 14 along the transverse direction T of the vehicle. The mounting flange 100 can be spaced away from the first housing portion 116 of the gearbox housing 14 in the vertical direction V of the vehicle. The mounting flange 100 can include a through hole 138. The through hole 138 can include internal threads that mate with external threads on the flanged bolt 102. The mounting flange 98 on the case 22 can include a corresponding through hole.

Figure 11:
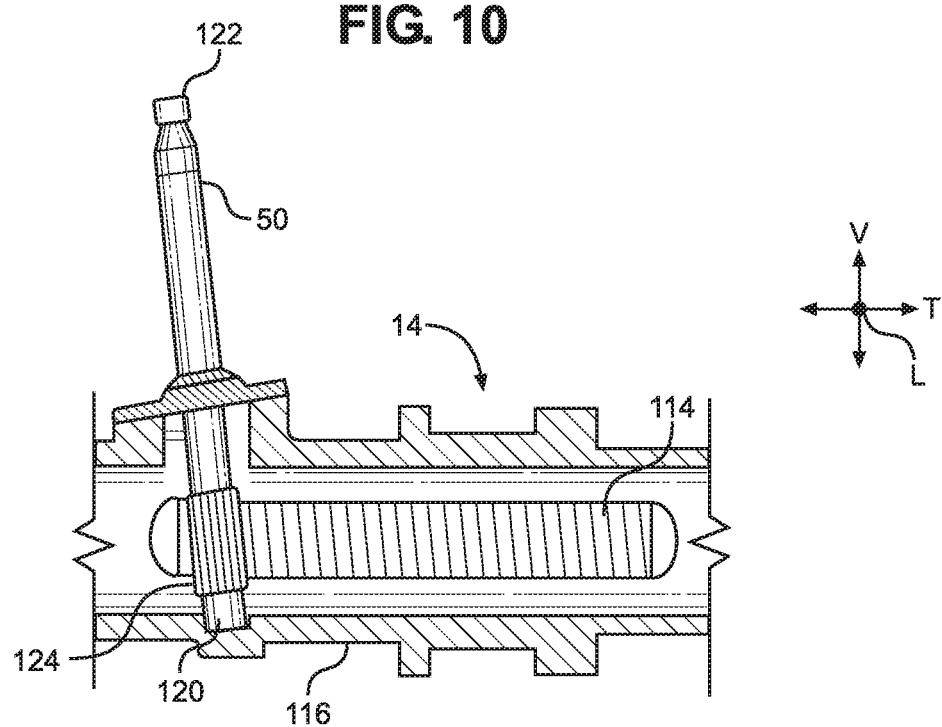
FIG. 11 is cross-sectional view taken along 11-11 of FIG. 10.

Referring to FIGS. 8 and 11, the gearbox housing 14 can include a rack 114. The first housing portion 116 of the gearbox housing 14 can support the rack 114 such that the rack 114 reciprocates in the first housing portion 116 along the transverse direction T of the vehicle.

Referring to FIG. 11, the pinion shaft 50 can include a first end 120, a second end 122 and a pinion 124. The first housing portion 116 can rotatably support the first end 120 and the second housing portion 118 can rotatably support an intermediate portion of the pinion shaft 50 with any appropriate structure such as but not limited to a rolling element bearing. The second end 122 can be spaced away from and outside of the second housing portion 118. The external splines 52 can be located between the second housing portion 118 and the second end 122.

The pinion 124 can be spaced away from and located between the first end 120 and the second end 122 and in the first housing portion 116. The pinion 124 can include gear teeth that mesh with gear teeth on the rack 114 such that rotation of the pinion shaft 50 about the axis of rotation AP causes the rack 114 to move along the transverse direction T of the vehicle.

Referring to FIG. 8, the steering gearbox 10 can include a pair of tie rods 126L, 126R, a pair of sockets 128L, 128R and a pair of dust boots 130L, 130R. Each of the tie rods 126L, 126R can include a ball formed at one end that is received in a respective one of the sockets 128L, 128R to form a ball and socket joint that permits the tie rods 126L, 126R to pivot relative to the rack 114. The dust boots 130L, 130R can be connected to each of the first housing 116 and a respective one of the tie rods 126L, 126R to formed a sealed spaced between the tie rods 126L, 126R and the first housing portion 116 of the gearbox housing 14.

Referring to FIGS. 8-10, the steering gearbox 10 can include a rack guide screw 132 and the gearbox housing 14 can include a first mounting structure 134 and a second mounting structure 136. The rack guide screw 132 can adjust a force applied to the rack 114 that pushes the rack 114 into engagement with the pinion 124. The mounting structures 134, 136 can connect the steering gearbox to a frame or a sub-frame of the vehicle.

While certain embodiments of the invention are described above, it should be understood that the invention can be embodied and configured in many different ways without departing from the spirit and scope of the invention.

For example, embodiments are disclosed above in the context of a vehicle that can be specialized for use on an unimproved path or on an unmarked path. However, the disclosed steering gearbox can be used with any vehicle that is configured for travel along any one or combination of improved, unimproved, and unmarked paths. For example, exemplary embodiments can include any type of automobile, including a passenger car, minivan, truck, other types of all-terrain vehicle (ATV), semi-tractor, off-highway vehicle, etc.

Exemplary embodiments can include any type of rotary coupling between the sensor collar 40 and the pinion shaft 50 that can cause the sensor collar 40 to rotate in unison with the pinion shaft 50. For example, the sensor collar 40 can be rotationally coupled to the pinion shaft 50 by a key that engages a keyway slot in each of the pinion shaft 50 and the sensor collar 40. Exemplary embodiments can include a set screw that is threaded into the sensor collar 40 and frictionally engages the pinion shaft 50.

Alternate embodiments can include the mounting flange 100 extending from the first housing portion 116 instead of from the second housing portion 118. Alternate embodiments can include one or more mounting structures in addition to the mounting flange 100 and on any appropriate portion of the gearbox housing 14, and one or more mounting structures in addition to the mounting flange 98 on any appropriate portion of the protective housing 16. Alternate embodiments can also include the mounting flange 98 extending from the cover 24 instead of from the case 22 such that the mounting flange 100 on the gearbox housing 14 extends above the protective housing 16 instead of below the protective housing 16.

Alternate embodiments can include the wiring opening 82 and/or the wiring housing 70 located on the case 22.

Alternate embodiments can include the bushing 94 fixed to the case 22 instead of the cover 24.

Alternate embodiments can also include the projections 96 for the bolts 34 on the case 22, and the cover 24 can include the through holes 28. Alternate embodiments can replace the projections 96 and blind bores 32 with through holes in the cover 24. A washer and nut could be threaded onto the bolt 34 to connect the case 22, cover 24 and gasket 26 together.

Alternate embodiments can also include a through hole 138 that is devoid of threads and the bolt 102 can include self-tapping threads. Alternate embodiments can include a through hole 138 that is devoid of threads and the threaded shaft of the bolt 102 can extend beyond the mounting flange 100 such that a nut and washer can be attached to the bolt 102.

What is claimed is:

1. A steering angle sensor assembly for a vehicle steering gearbox including a gearbox housing and a pinion shaft protruding from the gearbox housing, the sensor assembly comprising:
    a protective housing configured to be mounted to the gearbox housing, the protective housing includes,
        a case including a first opening through the case, and the first opening is configured such that the pinion shaft extends through the first opening when the protective housing is mounted to the gearbox housing;
        a cover including a second opening through the cover, and the second opening is configured to receive the pinion shaft when the protective housing is mounted to the gearbox housing, and
        a gasket sandwiched between the case and the cover, the case, the cover, and the gasket are bolted to each other such that the case, the cover and the gasket form an interior space; and
    a steering angle sensor secured in the interior space of the protective housing, and the steering angle sensor includes a mating spline configured to engage a spline on the pinion shaft such that the steering angle sensor detects rotational motion of the pinion shaft when the protective housing is mounted to the gearbox housing and the pinion shaft is received in the first and second openings.

2. The steering angle sensor assembly according to claim 1, wherein the case further includes:
    a main wall separating the interior space from an exterior space outside of the protective housing, the main wall has an inner surface that faces the interior space, and the first opening extends through the main wall; and
    a perimeter wall projects from and encircles the inner surface of the main wall.

3. The steering angle sensor assembly according to claim 2, wherein the case further includes:
    a mounting flange extending along the perimeter wall, and
    a first annular sealing surface extending along the mounting flange and the perimeter wall, and the first annular sealing surface engages the gasket.

4. The steering angle sensor assembly according to claim 3, wherein the cover further includes a second annular sealing surface that engages the gasket,
    one of the first and second annular sealing surfaces includes a groove; and
    the gasket includes a ridge that extends into the groove.

5. The steering angle sensor assembly according to claim 4, further comprising a wire harness electrically connected to the steering angle sensor, wherein
    the cover further includes,
        a wiring opening extending from the second annular sealing surface,
        a wiring housing in communication with the interior space and the wiring opening, and
        a grommet mounted in the wiring opening, the grommet is flush with the second annular sealing surface, and the grommet engages each of the cover, the wire harness, and the gasket such that the grommet forms a seal between the wiring opening and the wire harness, and
    the wire harness extends through the grommet and into the wiring housing.

6. The steering angle sensor assembly according to claim 1, further comprising:
    a sensor collar rotationally supported by at least one of the case and the cover, the sensor collar is a hollow cylindrical structure and includes an inner cylindrical surface, and the mating spline is formed on the inner cylindrical surface.

7. The steering angle sensor assembly according to claim 6, wherein
    the sensor collar includes an outer cylindrical surface and an annular groove formed in outer cylindrical surface, and
    the steering angle sensor includes a main body and a pair of lock arms extending from the main body and engaging the annular groove such that the lock arms slide in the annular groove when the sensor collar rotates relative to the case and the cover.

8. The steering angle sensor assembly according to claim 6, further comprising:
    a bushing fixed to one of the case and the cover and engaging the sensor collar such that the bushing supports rotation of the sensor collar relative to the case and the cover.

9. The steering angle sensor assembly according to claim 1, wherein one of the case and the cover includes a wiring opening configured to receive a wire harness when the wire harness is electrically connected to the steering angle sensor.

10. The steering angle sensor assembly according to claim 1, wherein
    one of the case and the cover includes a main wall and a plurality of projections spaced around a perimeter of the main wall, each of the projections extends away from the main wall, each of the projections includes a blind bore that is opened toward the gasket, and the blind bore includes internal threads,
    a different one of the case and the cover includes a plurality of through holes, each of the through holes is aligned with a respective one of the blind bores,
    the gasket includes a plurality of gasket through holes, each of the gasket through holes is aligned with a respective one of the blind bores; and
    the steering angle sensor assembly further including a plurality of bolts, each of the bolts extending through a respective one of the through holes and a respective one of the gasket through holes and threaded into a respective one of the blind bores.

11. The steering angle sensor assembly according to claim 1, wherein the cover includes the projections and the case includes the through holes.

12. The steering angle sensor assembly according to claim 1, wherein one of the cover and the case includes a main wall and a mounting flange extending away from the main wall, and the mounting flange is configured to be connected to the gearbox housing.

13. A steering gearbox for a vehicle comprising:
    a gearbox housing;
    a rack supported in the gearbox housing to reciprocate along a transverse direction of the vehicle;
    a pinion shaft extending into and rotatably supported in the gearbox housing, the pinion shaft includes a pinion that engages the rack, a portion of the pinion shaft is located outside of the gearbox and includes an external spline;
a protective housing mounted to the gearbox housing, the protective housing includes,
   a case including a first opening through the case, and the pinion shaft extends into the first opening and through the protective housing;
   a cover including a second opening that extends through the cover, and the pinion shaft extends through the second opening, and
   a gasket sandwiched between the cover and the case, the case, the cover, and the gasket are connected to each other such that the case, the cover and the gasket form an interior space; and
a steering angle sensor secured in the interior space of the protective housing, and the steering angle sensor includes a mating spline engaged with the external spline on the pinion shaft such that the steering angle sensor detects rotational motion of the pinion shaft.

14. The steering gearbox according to claim 13, wherein one of the case and the cover includes a main wall and a plurality of projections spaced around a perimeter of the main wall, each of the projections extends away from the main wall, each of the projections includes a blind bore that is opened toward the gasket and towards the rack such that they blind bore is opened downward with respect to the vehicle, and the blind bore includes internal threads,
a different one of the case and the cover includes a plurality of through holes, each of the through holes is aligned with a respective one of the blind bores,
the gasket includes a plurality of gasket through holes, each of the gasket through holes is aligned with a respective one of the blind bores; and
the steering angle sensor assembly further including a plurality of bolts, each of the bolts extending through a respective one of the through holes and a respective one of the gasket through holes and threaded into a respective one of the blind bores.

15. The steering gearbox according to claim 13, wherein the gearbox housing includes a first mounting flange,
one of the case and the cover includes a second mounting flange that is connected to the first mounting flange,
the gearbox housing further includes a first housing portion that extends along the transverse direction of the vehicle,
the rack is supported in the first housing portion, and
the first mounting flange is spaced away from the first housing portion.

16. The steering gearbox according to claim 15, wherein the gearbox housing further includes,
   a first housing portion extending along the transverse direction of the vehicle, the rack is supported in the first housing portion, and
   a second housing portion extending from the first housing portion along the rotational axis of the pinion shaft, the pinion shaft is supported in the second housing portion, and the first mounting flange extends from the second housing portion, and
the casing further includes,
   a cylindrical collar mounted on the second housing portion, and
   an O-ring that engages an outer surface of the cylindrical collar and an inner surface of the second housing portion and forms a seal between the cylindrical collar and the second housing portion.

17. The steering gearbox according to claim 13, wherein the first opening includes an inner cylindrical surface, and
the protective housing includes a seal mounted on the inner cylindrical surface and engaging the pinion shaft to form a seal between the pinion shaft and the first opening.

18. A steering angle sensor assembly for a vehicle steering gearbox including a gearbox housing and a pinion shaft protruding from the gearbox housing, the sensor assembly comprising:
a protective housing configured to be mounted to the gearbox housing, the protective housing includes,
   a case including a first opening through the case, and the first opening is configured to receive the pinion shaft when the protective housing is mounted to the gearbox housing;
   a cover including a second opening through the cover, and the second opening is configured to receive the pinion shaft when the protective housing is mounted to the gearbox housing, and
   a gasket sandwiched between the case and the cover, the case, the cover and the gasket are connected to each other such that the case, the cover and the gasket form an interior space; and
a steering angle sensor secured in the interior space of the protective housing, and the steering angle sensor is configured to engage the pinion shaft such that the steering angle sensor detects rotational motion of the pinion shaft when the protective housing is mounted to the gearbox housing and the pinion shaft is received in the first and second openings.

19. The steering angle sensor assembly according to claim 18, further comprising a plurality of bolts connecting the case, the cover and the gasket to each other.

20. The steering angle sensor assembly according to claim 18, wherein the steering angle sensor includes at least one spline that is configured to engage a mating spline on the pinion shaft when the protective housing is mounted to the gearbox housing and the pinion shaft is received in the first and second openings.

\* \* \* \* \*